(No Model.)
H. S. HITCHCOCK.
CLUTCH AND BRAKE FOR POWER PRESSES.
No. 351,438. Patented Oct. 26, 1886.
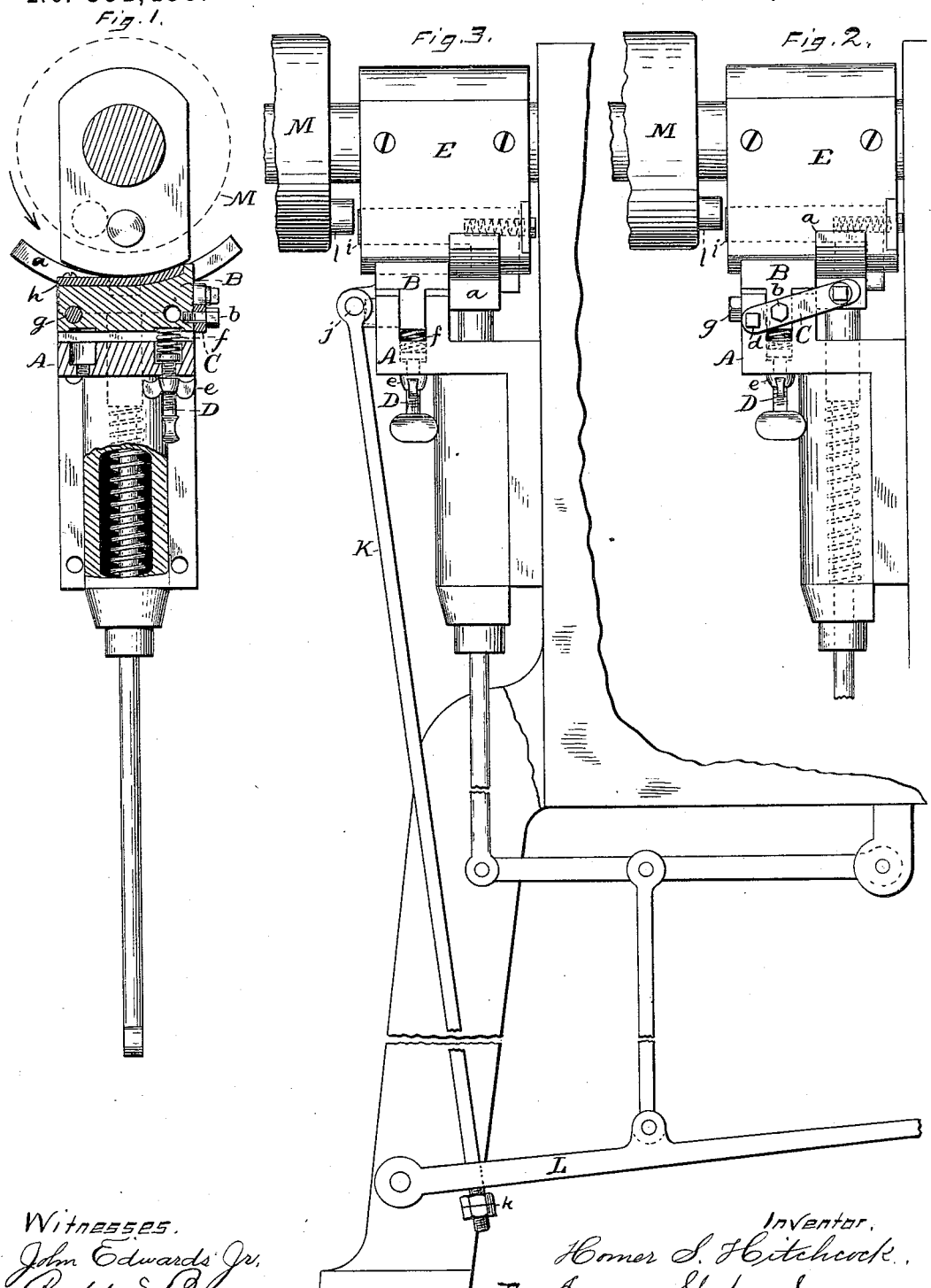
Witnesses.
John Edwards Jr.
Robt. S. Brown.
Inventor,
Homer S. Hitchcock,
By James Shepard
Atty
N. PETERS, Photo-Lithographer, Washington, D. C.

UNITED STATES PATENT OFFICE.

HOMER S. HITCHCOCK, OF MERIDEN, CONNECTICUT, ASSIGNOR TO ALANSON H. MERRIMAN, OF SAME PLACE.

CLUTCH AND BRAKE FOR POWER-PRESSES.

SPECIFICATION forming part of Letters Patent No. 351,438, dated October 26, 1886.

Application filed April 29, 1886. Serial No. 200,545. (No model.)

*To all whom it may concern:*

Be it known that I, HOMER S. HITCHCOCK, a citizen of the United States, residing at Meriden, in the county of New Haven and State of Connecticut, have invented certain new and useful Improvements in Clutches and Brakes for Power-Presses, of which the following is a specification.

My invention relates to improvements in that class of power-presses in which a positive clutch is used to impart motion to the press, and the pin of which clutch is acted upon by a tripping-latch connected with the treadle-rod; and the object of my invention is to provide a safe, sure, and simple means for stopping the motion of the press at the proper point.

In the accompanying drawings I have shown such parts of the press as are necessary to illustrate my invention. Figure 1 is a rear elevation, partly in section, of my improvement. Fig. 2 is a side elevation of the same; and Fig. 3 is a like view with a slight modification, showing a portion of the frame and operating mechanism.

The positive clutch mechanism herein shown consists of the wheel-hub M, bearing the stud $l$, the dog E, the clutch-pin $i$, sliding within said dog, and the wedge-shaped tripping-latch $a$, all of which are of ordinary construction, and when considered separately from my friction-brake are hereby disclaimed. Other ordinary clutch mechanism having a clutch-pin and tripping-latch may be substituted for that herein shown. The dog E is secured firmly to the press-shaft, while the wheel-hub M revolves loosely thereon. That edge of the dog which projects farthest from the press-shaft is convex and it is on a given side. I apply my friction-brake to this projecting surface of the dog, and thereby I always stop the press-shaft in a given position. I have constructed an offset, A, to the frame supporting the latch and treadle-rod, and integral therewith, which offset forms a support for a movable frictional brake, B. This brake is connected with the tripping-latch $a$ by a bar, C, pivoted at one end to said latch, and at the other end to the offset A at the point $d$. A connection is also made with the tongue of the movable frictional brake B at the point $b$.

It will be seen that the offset A is recessed to admit the tongue of the frictional brake B, beneath which is a setting-bolt, D, bearing against the spring $f$, which bolt is provided with a check-nut, $e$. The frictional brake is hinged at one end of the offset A by the bolt $g$, and is held up against the dog E, or in position to engage said dog, by the force of the spring $f$. This brake may be hinged at its opposite end and the position of the setting-bolt D changed, as I have indicated in Fig. 1. The frictional brake B is padded on its upper surface with a strip of leather, $h$, or any other suitable material, which may be fastened to the brake-seat by small screws or rivets. The surface of this brake is made slightly concave to fit the convex surface of the dog E. In Figs. 1 and 2 I have shown my brake as connected directly with the tripping-latch.

In Fig. 3 I make a direct connection of my brake with the treadle by means of a separate rod, K, pivoted to the brake at $j$, the lower end of which passes through a slot in the treadle-bar L. On the lower end of the rod K is a nut, $k$, so adjusted that when the press is in operation the frictional brake will be entirely withdrawn.

It will be seen that my improvement can be applied to other classes of machinery than power-presses, where a clutch-pin and tripping-latch are employed.

I do not wish to confine my invention to the particular construction herein shown for operating the brake B, as other equivalent means may be employed for the same purpose.

I am aware that a prior patent shows and describes a clutch mechanism for power-presses and analogous machines, in which a clutch-pin is withdrawn by a tripping-latch, and the shaft stopped by the head of the pin coming in contact with the shank of the tripping-latch, thereby forming a positive stop instead of a frictional brake.

I am also aware that prior patents show a friction clutch and brake for sewing-machines and other machinery in which an angle-lever is employed for moving the friction-clutch, to one arm of which lever a frictional brake was connected in such a manner as to bring the brake into and out of contact with the periphery of the wheel on the main shaft by the movement of the angle-lever in operating the friction-clutch. All of said prior art is hereby disclaimed. In the latter construction the brake acted on the continuous periphery of the wheel so that it would stop the shaft whenever the necessary amount of friction was applied after disengaging the friction-clutch, without regard to any particular point in its revolution, and for this reason such a clutch and brake are not adapted for use on power-presses which require that the shaft shall be stopped in a given position—that is, with the press-slide in its elevated position.

In my improvement the projecting surface of the dog on which the brake acts is at one side of the shaft only, and occupies but a small portion of a complete circle. Therefore the brake does not necessarily engage said surface the moment that it is allowed to rise into position for acting. For instance, suppose the treadle is depressed to withdraw the latch and liberate the clutch-pin, and then so soon as the pin $l$ on the wheel-hub M strikes the latch and starts the press-shaft that the treadle is released. The tripping-latch and brake immediately rise into position for action, but do not act until the shaft has nearly completed one revolution, and the wedge of the tripping-latch withdraws the clutch-pin, and the projecting surface of the dog engages the brake and stops the press in the position shown without any danger of injury to the parts.

I claim as my invention—

1. In a clutch-and-brake mechanism, the combination of a clutch-pin and tripping-latch with the dog having a projecting surface at a given side of the main shaft, and the frictional brake B, adapted to be brought into and out of position for engagement with said surface when the dog arrives at a given point in its revolution, substantially as described, and for the purpose specified.

2. In a clutch-and-brake mechanism, the combination of the dog having a projecting surface at a given side of the main shaft, the frictional brake for engaging said surface of the dog, the clutch-pin, the tripping-latch, and mechanism for connecting said latch and brake with an operating-treadle to simultaneously withdraw the brake and tripping-latch from said dog and clutch-pin, respectively, substantially as described, and for the purpose specified.

3. In a power-press, the combination of the movable frictional brake B, acting in the recessed offset A, the setting-bolt D, and the spring $f$, with operating mechanism, substantially as described, and for the purpose specified.

HOMER S. HITCHCOCK.

Witnesses:
E. A. MERRIMAN,
GEORGE A. CLARK.